United States Patent [19]

Todd

[11] 4,017,686
[45] Apr. 12, 1977

[54] TELEPHONE LINE VOLTAGE ACTUATED SWITCHES

[76] Inventor: Leonard M. Todd, 424 W. 119th St., New York, N.Y. 10027

[22] Filed: Sept. 26, 1973

[21] Appl. No.: 401,062

Related U.S. Application Data

[63] Continuation-in-part of Ser. No. 250,068, May 3, 1972, Pat. No. 3,794,767.

[52] U.S. Cl. .............................. 179/2 R; 179/6 R; 179/81 R
[51] Int. Cl.² .................. H04M 1/00; H04M 11/00
[58] Field of Search ................ 179/15 W, 2 A, 2 R, 179/5.5, 81 R, 81 C, 84 R, 84 A, 84 L

[56] References Cited

UNITED STATES PATENTS

| | | | |
|---|---|---|---|
| 2,228,673 | 1/1941 | Reeves | 179/2 |
| 3,146,310 | 8/1964 | Jeffries et al. | 179/6 R |
| 3,567,867 | 3/1971 | Rice et al. | 179/81 C |
| 3,818,141 | 6/1974 | Jacobson | 179/2 |

Primary Examiner—Raymond F. Cardillo, Jr.

[57] ABSTRACT

High (resting) telephone line voltage added to a bias voltage biases a semiconductor to cut-off; low (talking) voltage added to the bias voltage biases the semiconductor into conduction to actuate associated apparatus, such as a tape recorder, either directly or by actuating a second semiconductor.

3 Claims, 12 Drawing Figures

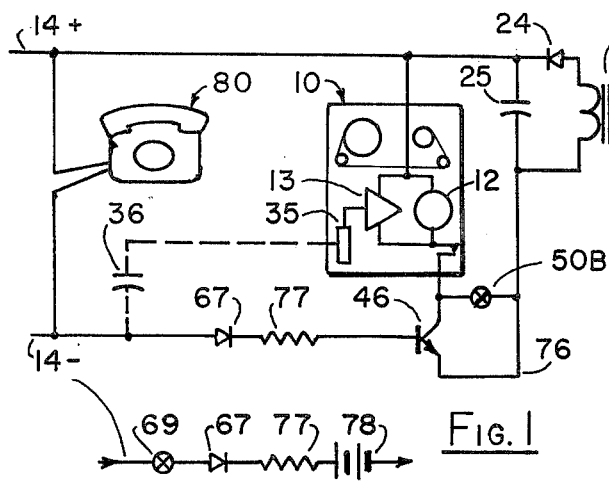
Fig. 1
Fig. 1A
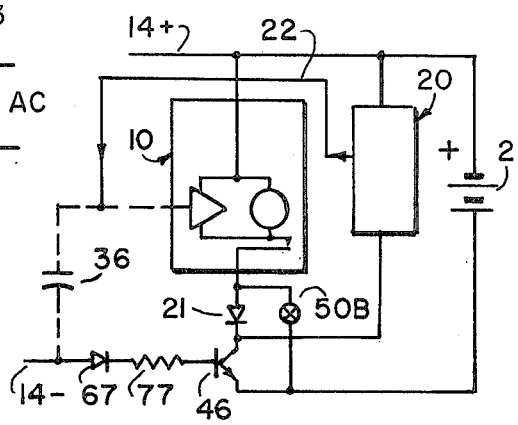
Fig. 1B
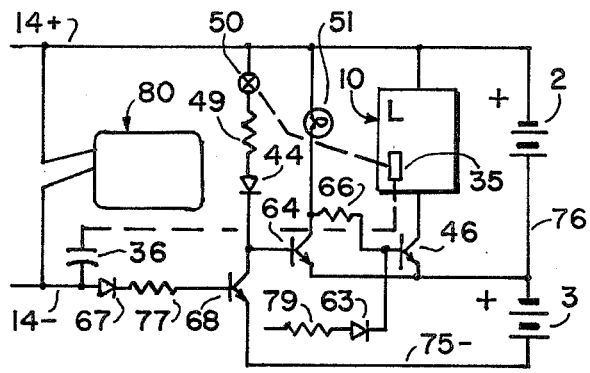
Fig. 2
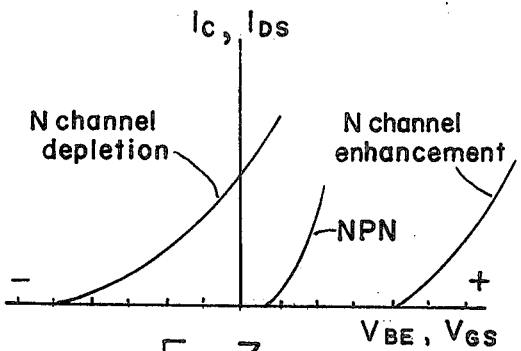
Fig. 3
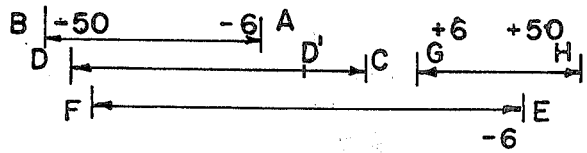
Fig. 3A
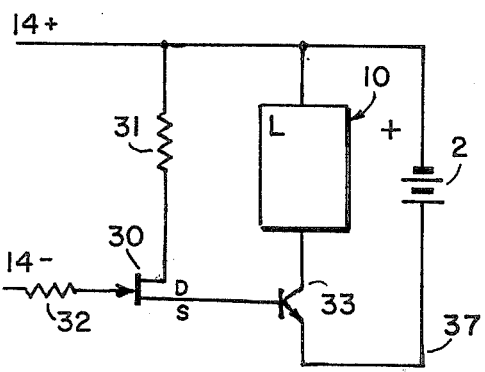
Fig. 5
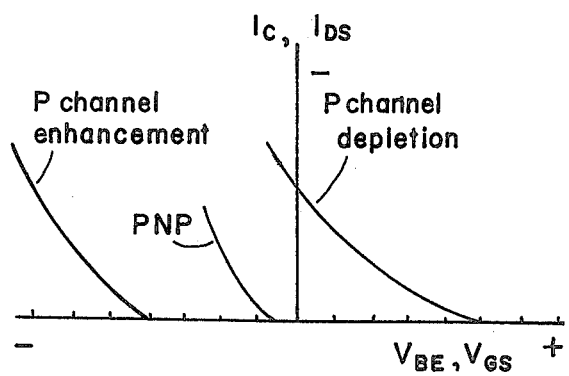
Fig. 4

TELEPHONE LINE VOLTAGE ACTUATED SWITCHES

BACKGROUND OF THE INVENTION

This application is a continuation in part of Ser. No. 250,068, Control Circuit for Telephone Answering Set, filed May 3, 1972, now U.S. Pat. No. 3,794,767 and is filed, in addition, pursuant to a requirement for restriction in the parent case.

This invention relates to circuits for actuating apparatus, particularly tape recorders, beep-tone generators, lamps, relays or the like, when the resting (high) voltage of the telephone line drops to or near talking (low) voltage, as occurs when the customer lifts the handset responding to a ring signal or to place a call or when the line is seized by the central office and the phone rings, as voltage drops on negative cycles of the ringing voltage. In the prior art, this was accomplished mainly by series circuits in which no current flowed during the resting state and current flowed through the handset in the talking condition, which would actuate a series relay to actuate other apparatus. Unsuccessful attempts were made to actuate relays in parallel with the line, employing the line voltage change, which necessarily drew excessive amounts of current from the line and accordingly interfered with telephone service. Other unsuccessful approaches were made to actuate transistors with the line voltage change.

Accordingly, it is an object of this invention to provide a telephone line voltage actuated switch to actuate tape recorders, beep tone generators, lamps, relays or the like by the voltage change while drawing only very small amounts of current from the telephone line without interfering with telephone service.

It is a further object of this invention to actuate such apparatus by a semiconductor such as a transistor in series with the apparatus and a power source, the semiconductor being actuated either directly by the line voltage change or by another semiconductor switch such as a bipolar or FET transistor connected to the telephone line, both arrangements which draw little current from the line.

SUMMARY OF THE INVENTION

The line voltage at the telephone set is usually 50 volts, resting voltage when the handset is down; when the handset is lifted, the voltage drops to 6 volts talking voltage. During ringing, a 90 volt 20 Hz ringing voltage is applied. During dialing, pulses of 50 volts, rising from 6 volts appear on the line as the dial switch opens and interrupts handset current. During "touch tone" dialing, the voltage is essentially talking voltage plus superimposed tones.

A bias voltage is added to the telephone line voltage causing a resutant which is applied to the control element of the semiconductor, the conducting terminals of which are in series with the load (tape recorder, for example) and the power source. The high resting voltage plus bias causes a resultant which is well below cut-off, the semiconductor does not conduct and the apparatus does not operate. The low talking voltage added to the bias causes a resultant which is substantially above cut-off, conduction occurs and current flows through the apparatus from the power source, and operates. In some circuits, a diode in series with the control element is back-biased by resting voltage and the control element is biased to zero volts in this state; current drawn from the telephone line is reduced to low nanoamperes which is not ordinarily detectable at the central office and does not interfere with service. At talking voltage, the diode is forward biased, conducts and the control element is also forward biased, so that the semiconductor conducts.

In some circuits, resting voltage causes conduction and talking voltage causes cut-off. The bias voltage may be furnished by the power source, by a separate source or by both the power source and a separate source.

In the drawings:

FIG. 1 is a circuit (from copending application, Ser. No. 250,068, now U.S. Pat. No. 3,794,767, FIG. 5) wherein a single transistor is biased to zero volts at resting voltage using a back-biased diode, with both the diode and transistor forward biased by talking voltage.

FIG. 1A shows the manner in which additional bias may be added to the power source bias with batteries.

FIG. 1B shows a circuit in which a beep-tone generator or other apparatus may be operated from the semiconductor when actuated by talking voltage and remains inactive when the main load or recorder is used for playback, etc. without complex switching.

FIG. 2 is a circuit similar to FIG. 1 (from copending application, Ser. No. 250,068, FIG. 4) employing a higher voltage bias source, intermediate between talking and resting, to provide for occasional high voltage conditions.

FIG. 3 shows typical transfer characteristic curves for NPN bipolar transistors, N channel depletion and N channel enhancement FET's (unipolar), both junction gate and metal oxide semiconductors, with terminal current (collector to emitter or drain to source) plotted against base to emitter voltage or gate to source voltage.

FIG. 3A shows the operating points for the three types of transistors and for inverse operation of an N channel enhancement FET.

FIG. 4 shows corresponding transfer characteristic curves for PNP and P channel FET's.

FIG. 5 is an arrangement whereby an N channel depletion FET actuates a transistor to operate a load with voltage change in the telephone line.

Figure 6:
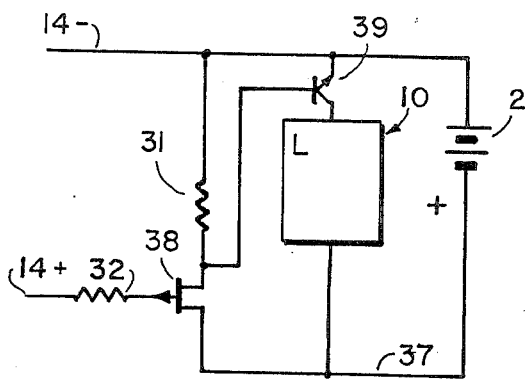

FIG. 6 corresponds to FIG. 5 using a P channel FET.

Figure 7:
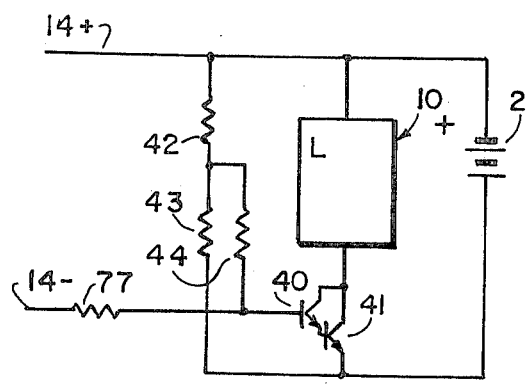

FIG. 7 shows a Darlington transistor backward biased by resting voltage and forward biased by talking voltage.

Figure 8:
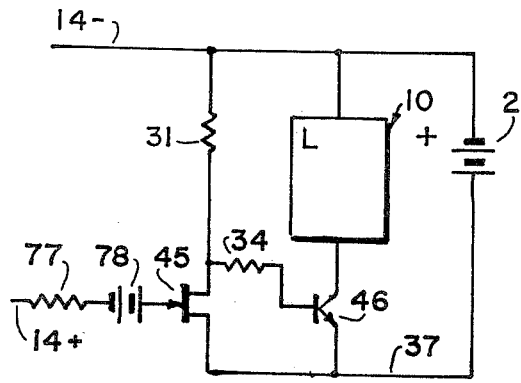

FIG. 8 shows a circuit for inverse operation with the semiconductor normally on with resting voltage and off with talking voltage.

Figure 9:
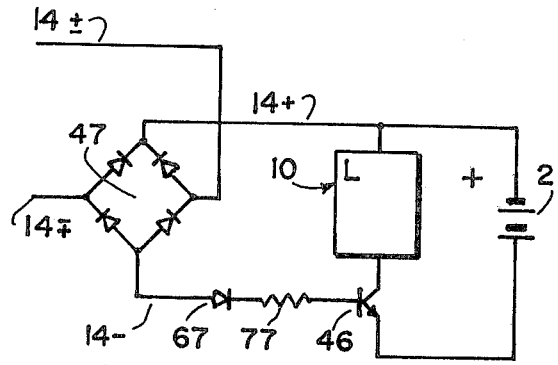

FIG. 9 shows a bridge rectifier input to enable connection to the telephone line without regard to polarity.

DESCRIPTION

The basic circuit is shown in FIG. 1 with most of the reference characters corresponding with FIG. 5, Ser. No. 250,068. The voltage difference in telephone line 14+, 14− during resting and talking, 50 volts and 6 volts respectively, actuates the circuit. Both voltages vary somewhat in practice; talking voltage may go as high as 12 volts with high transmitter resistance and it is often at 7 volts; with low supply voltage or high line resistance, it may be as low as 4 volts. Transistor 46 collector and emitter, tape recorder, 10, including amplifier 13 and motor 12 and power supply 23, 24 and 25 are in series. Batteries 2 may be substituted for 23, 24 and 25 and by reversing polarity of the diode, the power supply, and of the telephone line, the NPN transistor 46 may be replaced with a PNP unit. Only the motor 12 of the tape recorder 10 need be in series with transistor 46 and amplifier 13 may be in parallel with the motor, on continuously or actuated in a different manner.

When line 14— is at minus 50 volts, diode 67 is reverse biased from line 14+, recorder 10 and collector-base junction of transistor 46. Current flow is in the low nanoamperes. Since the base-emitter voltage of transistor 46 is zero, the transistor does not conduct and recorder 10 does not operate. When the handset is lifted, line seizure occurs, line 14— is minus 6 volts, talking voltage. The power supply in this example is in the order of 8 volts and line 76 is —8 volts providing the transistor bias. The addition of —6 to —8 volts yields a resultant of +2 volts which forward biases diode 67 and forward biases base-emitter junction of transistor 46 which conducts, operating recorder 10. Resistor 77 may be a relatively high value, further reducing current flow, both in talking and resting conditions.

With recorder 10 in record condition and the input of amplifier 13 coupled to line 14 by capacitor 36 or otherwise, actuation of recorder 10 causes incoming and outgoing conversations or communications to be recorded. On hanging up, recorder 10 is turned off automatically. Where an answering service is employed, answering by the service will be recorded by recorder 10. A ring signal in the telephone line will cause conduction intermittently at 20 Hz, and is sufficient to light a lamp or operate a relay in place of recorder 10.

For playback, switch 50B is closed, recorder controls are switched to rewind and play and the recorded communications may be heard. Switch 50B may be coupled to the record-play switch 35 avoiding an unnecessary operation.

FIG. 1A shows an alternate method of adding bias when recorder 10 is operated on a relatively low voltage, say 6 or less, or when the line voltage at talking is relatively high, say 8 volts or more. Batteries 78 may be added in the telephone line to diode to base of transistor 46 to make up the difference and cause a positive differential to actuate the transistor during talking. By using mercury cells, the life of the batteries is relatively long, exceeding two years in some cases.

This system is readily adapted to law enforcement wire-tapping. While there is considerable legal merit to the customer recording his own conversations without notice to the other party, the Federal Communications Commission regulations provide for a beep-tone to be employed and tariffs are established requiring a recorder-connector to be furnished by, installed and maintained by the telephone company which also charges a monthly fee. There is considerable legal controversy over the beep-tone requirement.

In FIG. 1B beep-tone generator 20 is actuated when talking voltage causes transistor 46 to conduct. The beep-tone, by FCC definition is a 1400 Hz tone lasting 1/5 sec., repeated every 12 to 15 seconds, at a level about equal to speech. When switch 50B is closed to energize recorder 10 for rewind and playback, diode 21 prevents the beep-tone generator 20 from being actuated by the power supply, without the need for more complex switches. The output of the generator is coupled to input of amplifier 13 and to the telephone line by capacitor 36 so that recorded conversations will have the beep-tone and the party at the remote end of line will hear the beep-tone. The apparatus may be turned off by a switch as by switch 69.

While not shown in the figures, other means may be used to adapt these circuits to low recorder operating voltage or high telephone line voltage at talking, and obtain a positive voltage differential for actuation of transistor 46. A higher supply voltage may be used with either a dropping resistor in series with the recorder or a Zener diode may be used, which provides a drop independent of current flow.

A relay coil may be inserted in the circuit in place of recorder 10. The relay contacts may be used to operate other apparatus or even a similar recorder 10. Of some importance is the application of these circuits to the actuation of a supervisory lamp in place of recorder 10, as the load, particularly at multi-key telephone sets, reducing the complexity of existing circuits. In general, in FIGS. 1–2 and 5–9, where the rectangle L, 10 is indicated, this may be any load, including recorder 10, motor 12, relay coil, amplifier 13, beep-tone generator, lamp, etc. or combinations thereof.

Where increased reliability is required and there is a likelihood of the voltage at the telephone set rising to 10 volts for example, or to protect against circuit failure from a reduction of battery 2 voltage below talking voltage, FIG. 2 provides an alternate manner of adding bias voltage to increase operating differential. Power supply 23, 24, 25 of FIG. 1 may be substituted for battery 2 and a similar supply used in place of battery 3, which furnishes an additional bias voltage of say 10 volts so that line 75— is more negative. With battery 2 at 8 volts, this would make line 75— minus 18 volts with respect to 14+, intermediate between talking and resting line voltages including extremes of talking variations from 4 to 12 volts, at which voltages, line 14— would be +14 and +6 volts greater than 75—. At resting, line 14— at minus 50, would be —32 volts with respect to 75—. Switch 50 is coupled to record-play switch 35 and when line 14— is at —50 volts, diode 67 is backward biased, as for FIG. 1, the base of transistor 68 is at zero volts and does not conduct. Current flows from supply 2 to switch 50, resistor 49 and diode 44 to base of buffer inverter transistor 64 which is turned on, lighting lamp 51. The drop across transistor 64 is low and the voltage is further reduced by resistor 66 to base of transistor 46 which thereby remains off and recorder 10 or equivalent load in its place is also off.

With handset lifted, 14— voltage becomes —6 volts, talking voltage, which is +12 volts with respect to line 75— which is —8 volts. Diode 67 conducts and base-emitter junction of transistior 68 is forward biased and the transistor conducts. Collector to emitter voltage drop of transistor 68 goes low, causing the base of transistor 64 to go low and cease to conduct. Lamp 51 goes out. Voltage at collector of transistor 64 rises and current flow through lamp 51 (insufficient to light the lamp) and resistor 66 to base of transistor 46 causes this transistor to conduct and operate recorder 10 or equivalent load. When line voltage goes to resting —50 by the customer hanging up, the reverse process occurs as outlined in the preceding paragraph and recorder 10 or equivalent load goes off. As before, recorder 10 is coupled by capacitor 36 or other suitable means to telephone line 14+, 14— causing conversations to be recorded. With switch 50 off and record-play switch 35 in play condition, transistors 68 and 64 are unaffected by telephone line voltage; transistor 46 is kept normally on by low current flow from 14+ (battery 2) through lamp 51 and resistor 66 to base of transistor 46 so that recorder 10 may be turned on and off in playback or forward or rewind with its controls.

FIG. 3 shows typical transfer characteristic curves pf N channel depletion and N channel enhancement FET's, both junction gate and metal oxide semiconductors (MOS) (unipolar) and NPN (bipolar) at selected collector to emitter voltage or base current and for the FET's at selected load and drain to source voltage. In both the enhancement FET and bipolar transistor there is no conduction at zero bias, the FET gate must be forward biased to produce carriers for conduction to occur. In the transistor, the base to emitter junction must be forward biased for collector-emitter current to flow. The transistor starts to conduct at from 0.06 to 0.8 volts base-emitter bias. The depletion J-FET (more common) conducts at zero bias and the gate to channel structure is a p-n junction. Reverse bias induces a charge to reduce channel current flow which goes to zero at cut-off bias. At forward bias (above zero), the p-n junction conducts and power gain diminishes. MOS-FET gates are insulated from the channel structure and do not conduct at forward bias, in both depletion and enhancement types.

Enhancement FET's and transistors are similar in requiring forward bias to start conduction.

In FIG. 4 are the transfer characteristic curves for P channel depletion, P channel enhancement FET's and PNP transistors, comparable to the curves of FIG. 3 except for reverse polarity. In both FIGS. 3 and 4, abscissa axis is bias with origin zero, and ordinate axis is terminal current flow, collector to emitter or drain to source, with origin zero.

In FIG. 3A under the abscissa axis, are examples of the operating points at −50 v. resting and −6 v. talking added to bias to produce the resultant applied to the control element. Points B, D and F are in cut-off and points A, C and E are in conduction for the three types of units. Point D' is zero bias for the NPN transistor at cut-off with a series diode bucking the resting voltage as in FIGS. 1–2. Points G and H result by adding a positive bias to N channel enhancement gate, causing inverse operation described in FIG. 8.

Similar operating points are determined by this procedure for FIG. 4 P channel FET's, PNP transistors and Darlington PNP transistors.

The operating base emitter cut-off voltage of a Darlington transistor is about 0.25 volts higher than for one transistor (typically) and the same voltage is 0.25 volts higher again for a three transistor Darlington. Transfer curves are progressively steeper reflecting the higher gain of the Darlington arrangements and the lower base current required for operation.

In FIG. 5, N channel FET 30 receives 6 volts from battery 2 and resistor 31. This voltage may vary over a wide range and is chosen here as a commonly occurring value, adequate for recorders. The gate is coupled to 14− of the telephone line resistor 32 which may be 10 to 100 megohms. The current drawn from the telephone line at resting is a small fraction of a microampere which does not interfere with service and is difficultly detectable. Operating points A and B are given in FIG. 3A; at point B, resting, the FET is biased well into cut-off, no current flows through the FET, the base-emitter junction of transistor 33 does not conduct and load 10 is therefore off. At point A, talking voltage, line 14− is minus 6 volts to line 14+; line 37 is minus 6 volts to line 14+ and the base-emitter drop of transistor 33 is about 1.0 volt. The source of FET 30 is then −5 volts to line 14+ and gate to source is −6 minus −5 = −1 volt, well into the conduction region. FET 30, base-emitter of transistor 33 and the transistor all conduct and load 10 operates. As noted above, load 10 may be a recorder, the recorder motor, amplifier, beep-tone generator, relay coil, lamp or other apparatus. With the handset hung up, voltage returns to resting, transistor 33 is biased to cut-off (zero) and load 10 is turned off. This circuit operates with a lower bias and power source voltage than FIG. 1 in which transistor 46 does not conduct until base-emitter voltage exceeds (say) 0.5 volts. High gain transistors or Darlington transistors at transistor 33 may be helpful. (Also in FIG. 6). The circuit of FIG. 5 may be rearranged to operate with a P channel FET, PNP transistor and reversed polarity of battery 2 and line 14+, 14−. A sensitive relay may be placed in the position of resistor 31 and source returned to battery 2 negative and the relay will operate other equipment.

In FIG. 6, transistor 39 is actuated by the drop across resistor 31 and operates substantially as does FIG. 5 except for the base-emitter drop. When gate-source of FET 38 is biased into conduction by talking voltage plus bias (battery 2), the voltage across resistor 31 forward biases the base-emitter junction of transistor 39, which conducts and load 10 operates. As with FIG. 5, the circuit of FIG. 6 may be rearranged with an N channel FET, NPN transistor and battery and line voltage polarity reversed.

In the circuits of FIGS. 5–6, N and P channel enhancement FET's may be used by employing higher voltages at battery 2, by adding bias batteries in the gate-telephone line, in the manner of FIG. 1A or the circuit of FIG. 2 or other expedients may be used.

Where MOS-FET's are used, precautions should be taken to prevent static charges from causing damage, such as by providing a higher resistance connection from gate to source or drain.

FIG. 7 is similar to FIG. 1 with the difference that diode 67 is removed and a Darlington transistor 40–41 replaces transistor 46. This circuit draws larger currents from the telephone line at resting voltage, in the order of a microampere, compared with the circuits of FIGS. 1–2, 5–6. A small forward bias added by resistors 42–44 or similar arrangement, permits operation when battery 2 voltage is slightly lower than talking line voltage. The resting voltage reverse biases the base of the first transistor so that load 10 will not operate. The Darlington transistor requires much lower current to maintain cut-off than the single transistor 46 of FIG. 1 (or transistor 68 of FIG. 2) when used without diode 67. A three transistor Darlington further reduces current drain at resting.

In FIG. 8 is an inverse circuit with N channel enhancement type FET 45 normally on during high, resting line voltage, and off during talking. The circuit is useful because of the small telephone line current required to maintain the FET in conduction. However, there is a constant drain by the normally on FET which is a disadvantage when batteries are the power source. Operating points are G, +6 volts, talking and H, +50 volts, resting for enhancement type FET in FIG. 3A. With source of FET 45 and line 37 at minus 6 volts and line 14+ at plus 50 volts, FET 45 is biased normally on. For cut-off, bias batteries 78 must be added to reach +4 volts, typical value; 8 volts negative bias as batteries will serve. +6 v. (line) −8 (bias) minus −6 v. (source)

= +4 volts, gate to source. With FET 45 conducting at resting voltage, base-emitter junction voltage is low and transistor 46 is off, with load 10 off. With FET 45 off at talking voltage, base-emitter junction voltage is high through resistors 31 and 34, causing transistor 46 to conduct and load 10 operates.

It is desirable to use a slightly higher bias to compensate for variations in transistor characteristics, line voltage, battery voltage and the like. In this circuit, transistor 46 is an inverter switch. It is seen that this circuit is applicable with proper bias voltages to depletion type FET's and P channel enhancement and depletion FET's. These circuits illustrate the application of the principles of this invention to several variations.

While the principle is not new, FIG. 9 shows an additional circuit wherein bridge rectifier 47 connects telephone line 14+, 14− to the circuit of FIG. 1, so that connection may be made without regard to polarity without a need to take particular care. Two of the rectifiers in the bridge circuit conduct causing a drop which reduces the available differential for operation of the input semiconductor. The circuit is applicable to the other circuits taught herein.

Generally, with respsect to FIGS. 3–4, and in the claims, an increase in voltage of the control element with respect to a current conducting terminal is a change in the direction of increased terminal current flow. A decrease in voltage of the control element is a change in the direction of decreased terminal current flow. In a similar manner, a voltage higher than cut-off is removed from cut-off in the direction of increased current flow; a voltage lower than cut-off is removed from cut-off in the direction of decreased current flow.

The circuits taught and claimed include the connection of a semiconductor to the telephone line with the power source acting as a bias source, with a separate bias source providing the entire bias, with a bias source adding to the power source to augment the bias and with the reduction of telephone line voltage with a divider to cause resting and talking to be below and above cut-off, and all practical combinations thereof are intended. Modifications may be required to the principles and the particular circuits where higher or lower load current or operating voltages are encountered.

It is seen that one side of the telephone line is connected to the base or gate of a semiconductor, with a high value resistor located in the telephone line input and that the other side of the telephone line may be particularly connected as described or by the equivalent, connecting that side to a point in the series circuit of the current conducting terminals, the power source and the load impedance, including intermediate points in the power source and the load impedance. Preferred constructions are taught.

The circuits of FIGS. 6 and 8 resemble FET voltmeters and this may be combined with the principles of this invention by connecting a high resistance voltage divider across the telephone line, say 50 to 100 megohms, tapped at about one-quarter of the voltage, yielding approximately minus 12 volts (¼ of 50 v.) at resting and minus 1.5 v. at talking (¼ of 6 v.); these voltages connected directly to gate and source of a depletion FET will drive the FET to cut-off during resting and into conduction during talking and the FET current may be employed to actuate a transistor to operate a recorder. As indicated in the preceding paragraph, the voltage divider may be connected to the gate and other points in the FET series circuit. The divider circuit may be applied to external base and emitter of the Darlington transistor in FIG. 7. These circuits have the disadvantages of higher complexity, larger number of components, and relatively high current draw from the telephone line, ½ or so microampere at resting.

An illustration of possible variations on the principles taught is to connect FET 30 drain and source, FIG. 5, to the base and collector of transistor 33, using a series resistor.

In the claim, the word semiconductor indicates solid-state devices including FET's, both junction gate and metal oxide (MOS-FET's), transistors, NPN and PNP, and dual and triple Darlington transistors and the like.

The teaching of the use of transistor in series with the recorder and the power source to actuate the recorder is highly useful, eliminating one relay and is applicable to variations of the voltage actuated switch described herein and in the patent application, Ser. No. 250,068, to a telephone answering set.

In the claims, the word "semiconductor" may include transistor equivalents such as Darlington transistors, FET's coupled to transistors, complementary transistors as seen for example in the output circuit of uA709 operational amplifiers, quasi-complementary transistors (two transistors of like polarity in series), operational amplifiers, CMOS transistors, and so on, without departing from the spirit and the principles of this invention. The circuits taught are preferred; equivalent common base and common collector circuits are possible.

The words "tape recorder" in the claims include equivalents such as drum, disk and belt magnetic recorders. Where the motor is indicated to be in series with the current conducting terminals of a semiconductor, the amplifier may be in parallel with the motor.

The words "associated apparatus" and "load impedance" in the claims have similar meanings; the current through the load impedance or associated apparatus may be used to actuate succeeding semiconductors of the "load impedance" may comprise the associated apparatus.

I clam:

1. A voltage actuated switch for a telephone line having first and second conductors and a high resting and a low talking voltage comprising a semiconductor having a control element and two current conducting terminals, a load impedance and a power source having two terminals, said semiconductor ceasing to conduct when a voltage impressed on said control element with respect to one of said current conducting terminals is lower than a cut-off voltage, said semiconductor conducting when a voltage impressed on said control element with respect to said one of said current conducting terminals is higher than said cut-off voltage; said current conducting terminals, said load impedance and said power source connected in a first series circuit; a second series circuit comprising (a) said first conductor connected to said control element, (b) one of said current conducting terminals connected to one terminal of said power source, (c) the other of said terminals of said power source connected to said second conductor; said power source connected in voltage opposition to said telephone line voltage, said telephone line voltage and said power source voltage combining vectorially to a resultant voltage applied to said control element with respect to said one of said current conducting terminals, said high resting voltage subtracted from said power source voltage yielding a first resultant voltage lower than said cut-off voltage, said semiconductor ceasing to conduct, said low talking voltage subtracted from said power source voltage yielding a second resultant voltage, higher than said cut-off voltage, said semiconductor going into conduction, causing current flow in said first series circuit from said power source through said current conducting terminals and said load impedance, said current being employed to actuate associated apparatus.

2. A voltage actuated switch for a telephone line having first and second conductors and a high resting and a low talking voltage comprising a semiconductor having a control element and two current conducting terminals, a load impedance, a power source having two terminals and a bias source, said semiconductor ceasing to conduct when a voltage impressed on said control element with respect to one of said current conducting terminals is lower than a cut-off voltage, said semiconductor conducting when a voltage impressed on said control element with respect to said one of said current conducting terminals is higher than said cut-off voltage; said current conducting terminals, said load impedance and said power source connected in a first series circuit; a second series circuit comprising (a) said first conductor connected to said control element, (b) one of said current conducting terminals connected to one terminal of said power source and (c) the other of said terminals of said power source connected to said second conductor, said bias source inserted in said second series circuit, said bias source and said power source connected in voltage opposition to said telephone line voltage, said telephone line voltage, said bias voltage and said power source voltage combining vectorially to a resultant voltage applied to said control element with respect to said one of said current conducting terminals, said high resting voltage subtracted from said bias voltage and said power source voltage yielding a first resultant voltage lower than said cut-off voltage, said semiconductor ceasing to conduct; said low talking voltage subtracted from said bias source voltage and said power souce voltage yielding a second resultant voltage higher than said cut-off voltage, said semiconductor going into conduction, causing current flow in said first series circuit from said power source through said current conducting terminals and said load impedance, said current being employed to actuate associated apparatus.

3. A voltage actuated switch for a telephone line having first and second conductors and a high resting and a low talking voltage comprising a transistor having a base, emitter and collector, a diode, a load impedance and a power source having two terminals, said transistor conducting when a voltage impressed on said base is higher than a cut-off voltage with respect to said emitter, said transistor ceasing to conduct when a voltage impressed on said base with respect to said emitter is lower than said cut-off voltage; said load, said power source, said collector and said emitter connected in a first series circuit; a second series circuit comprising (a) said first conductor connected to said base, (b) said emitter connected to one of said terminals of said power source, and (c) said second of said terminals of said power source connected to said second conductor of said telephone line; said diode inserted in said second series circuit oriented in opposition to normal current flow from said telephone line, said power source voltage connected in voltage opposition to said telephone line voltage, said power source voltage and said telephone line voltage vectorially combining to a resultant voltage applied to said diode and to said base with respect to said emitter, said high resting voltage subtracted from said power source voltage yielding a first resultant voltage back biasing said diode preventing current flow from said telephone line, and in said second series circuit, and causing said voltage of said base with respect to said emitter to be below cut-off, causing said transistor to cease conduction; said low talking voltage subtracted from said power source voltage yielding a second resultant voltage forward biasing said diode and biasing said base above cut-off with respect to said emitter, causing said transistor to conduct and current to flow in said first series circuit from said power source through said transistor and said load impedance.

* * * * *